United States Patent Office 3,324,088
Patented June 6, 1967

3,324,088
PROCESS FOR VULCANIZATION OF
ELASTOMERS
Thomas Frederick Waldron, Hillsborough Township,
Somerset County, N.J., assignor to American Cyanamid
Company, Stamford, Conn., a corporation of Maine
No Drawing. Filed Mar. 17, 1966, Ser. No. 535,015
10 Claims. (Cl. 260—79.3)

This application is a continuation-in-part of application Ser. No. 285,200, filed June 4, 1963, now abandoned.

This invention is concerned with an improved curing procedure for synthetic, rubber-like, vulcanizable, elastomeric copolymers containing active halogen. More particularly, this invention relates to the use of ammonium salts of weak organic acids as curing agents for such elastomers; to the compounding of the latter into vulcanizable compositions which have good scorch properties; to the vulcanization thereof; and to the resultant products, both vulcanizable and vulcanized.

Halogen-containing elastomers with which the present invention is concerned include several different commercially available types. Chlorine is the most commonly active halogen and will be used in this discussion as illustrative.

One class of such elastomers includes copolymers which comprise in major proportion a polymerized lower alkyl acrylate and in minor proportion a copolymerized monomer containing the active halogen. Herein, accordingly, the term "acrylate elastomers" is used to designate such polymers and copolymers.

Another group of active halogen-containing elastomers which may be cured in accordance with the present invention are often referred to as "polychloroprene" polymers. As used herein, the term "polychloroprene" includes not only polymers of chloroprene (2-chloro-1,3-butadiene), but also copolymers thereof with polymerizable vinyl or diene compounds wherein chloroprene is the predominant monomer.

Other types of chlorine-containing elastomers which may be used in the vulcanization process of this invention include, for example, chlorinated butyl rubber; polymers of chlorinated and/or chlorosulfonated polyethylene.

Such elastomers are of particular interest because of their outstanding resistance to deterioration due to heat. They perhaps have the best such properties of all commercial rubbers, except for some silicones and some highly-fluorinated elastomers made for special applications. They also are highly resistant to flexural breakdown, compression set, ozone, ultraviolet light, mineral oils and gas diffusion. They have been recommended and widely used in gaskets, hose, conveyor belts, valve seats, packings, oil seals, printing rolls, protective coatings, transformer leads, electrical insulation and the like.

Specialty elastomers based on polymers of alkyl acrylates were introduced to the trade many years ago. Ethyl acrylate, being the most commonly used esters, will be taken as illustrative. Such polyacrylic esters do contain reactive groups which can be used for vulcanization with some special recipes. Unfortunately, the number of such recipes and thus the opportunity for preparing vulcanizates of different types and properties are limited. For this reason, much attention has been given to preparing polyacrylates having reactive functional groups that facilitate vulcanization.

Such functional groups have been introduced by copolymerizing ethyl acrylate with variable amounts of a suitable copolymerizable monomer containing the desired group. Perhaps the most used and generally-preferred elastomers have comprised copolymers of ethyl acrylate with varying amounts of a copolymerizable chlorine-containing monomer such as a 2-chloroethyl vinyl ether; 2-chloroethyl acrylate; vinyl chloroacetate and the like.

A number of acrylate elastomers are commercially available. Among these, for example, are copolymers of ethyl acrylate and some five weight percent of 2-chloroethyl vinyl ether; copolymers of ethyl acrylate and some five percent of 2-chloroethyl acrylate; and copolymers of some seventy percent or more of ethyl acrylate and up to fifteen percent of vinyl chloroacetate.

Various agents previously have been used or suggested for the curring of acrylate elastomers. Therein, reactive halogen atoms facilitate vulcanization if a suitable cross-linking agent is used. Among the curing agents which have been suggested are ammonia and various primary and secondary amines. Unfortunately, for most purposes, ammonia and amines are too fast reacting as curing agents for many purposes causing premature curing and scorching. Particularly is this true of the newer elastomeric copolymers of ethyl acrylate and vinyl chloroacetate. These elastomers, when formulated, are largely used for making molded shapes. It is highly important they be capable of flow into a hot mold without premature curing.

It is therefore, one major object of the present invention to provide a curing agent for "acrylate" and "non-acrylate" halogen-containing elastomers which will permit;

(1) process safety during compounding of the elastomeric stock;
(2) good shelf life of the compounded stock;
(3) good flow of elastomer into the hot mold, prior to curing;
(4) adequately short curing cycles or fast rates of cure; and
(5) the use both of medium and of high curing temperatures.

Unexpectedly, it has been discovered in this invention that ammonium salts of weak organic acids are excellent curing or vulcanizing agents for the acrylate elastomers. Their use accomplishes the foregoing object to a surprisingly successful degree, particularly in view of the prior period in which ammonia per se and the amines have been tried and found wanting.

In contrast with previously available curing agents, which gave a compounder only a limited time to compound the elastomer before scorching occurred, the organic ammonium salts of this invention allow ample processing time. At temperatures below curing temperature ranges, the salts are stable and provide processing safety. They permit the elastomers to flow into the mold before curing occurs. However, at the temperatures ordinarily used for curing (usually above 150° C.) the ammonium salts used in this invention do produce rapid curing. Resultant short vulcanization times enable the manufacturer to produce more finished articles per unit of available machine time and thereby reduce the manufacturing cost.

It is quite unexpected that the ammonium salts used in this invention are capable of imparting scorch resistance to the vulcanizable elastomeric composition, since ammonium salts of inorganic acids such as ammonium carbonate (use of which is disclosed in British Patent No. 850,285 of Oct. 5, 1960), ammonium chloride, etc., which are efficient curing agents, lead to compositions which are quite scorch-prone. The poor rheological properties of vulcanizable elastomers based on inorganic ammonium salts, rule them out as commercially acceptable materials.

A further advantage of the present invention is that the curing agents of choice are readily-available ammonium salts of weak organic acids. The salts which are useful include, for example: ammonium acetate, ammonium benzoate, ammonium propionate, ammonium stearate, ammonium terephthalate, ammonium adipate, and the like. It will be noted that salts of both mono- and polybasic acids are contemplated. They may be salts of almost any organic acid having a pKa value of above about three. The upper limit is not critical. However, use of salts of organic acids having a pKa of from about four to about eight usually will be preferable. Mixtures of salts also may be used.

Broadly, useful concentrations of organic ammonium salt in the compounded elastomer may range from as little as about one to as high as about twenty parts per 100 parts of elastomer. However, good general practice will be found to employ from about two to about ten parts per 100 and this is the generally preferred range.

It is often advantageous, but not necessary, to use a small amount of a metallic oxide with the ammonium salt. A metallic oxide such as magnesium oxide, by itself will not adequately cure the elastomer. However, when some 0.05 to 5.0 parts per 100 parts of elastomer are used with the organic ammonium salt, magnesia does accelerate the rate of cure and reduce the amount of corrosion experienced by the compounding and curing equipment. When using an oxide, about 0.5 to 2 parts per 100 parts of elastomer usually will be found to be good practice.

Standard compounding procedures are used for incorporating the organic ammonium salt; the magnesia, if used; and other compounding ingredients into the elastomer. In general, curing temperatures above 150° C. are recommended. Otherwise no changes in the known curing practice are required.

The invention will be further illustrated in conjunction with the following examples. Therein, unless otherwise noted, all parts and percentages are by weight and all temperatures are in degrees centigrade.

*Example 1*

A masterbatch containing 100 parts of a 97.5/2.5 acrylate/vinyl chloroacetate elastomer, 50 parts of SRF carbon black and 2 parts of stearic acid was prepared. The masterbatch was milled on a rubber mill with 17.8 parts of ammonium stearate for 15 minutes at a temperature of 50–80° C. The elastomer mix was removed from the mill and cured in a mold under pressure at a tmperature of 160° C. for 60 minutes. The vulcanizate had the following properties:

Tensile strength, p.s.i. _____ 1100
Elongation, percent _____ 700
Modulus, 300% elongation, p.s.i. _____ 325
Hardness, Shore _____ 40

*Example 2*

A masterbatch of the composition of Example 1 was compounded with 2.0 parts ammonium benzoate and 0.65 part magnesium oxide. The elastomer mix was cured at 155° C. for 13.9 minutes. The vulcanizate had the following properties:

Tensile strength, p.s.i. _____ 1075
Elongation, percent _____ 630
Modulus, 300% elongation, p.s.i. _____ 700
Hardness, Shore _____ 52

*Example 3*

A masterbatch of the composition of Example 1 was compounded with 6.4 parts of ammonium benzoate. The compounded elastomer had a Mooney scorch time of 14.0 minutes. The elastomer mix was cured at 165° C. for 8 minutes. The vulcanizate had the following properties:

Tensile strength, p.s.i. _____ 1150
Elongation, percent _____ 540
Modulus, 300% elongation, p.s.i. _____ 825
Hardness, Shore _____ 46

*Example 4*

A masterbatch of the composition of Example 1 was compounded with 3.5 parts of ammonium acetate and 0.5 part of magnesium oxide. The elastomer mix was cured at 165° C. for 8 minutes. The vulcanizate had the following properties:

Tensile strength, p.s.i. _____ 1575
Elongation, percent _____ 520
Modulus, 300% elongation, p.s.i. _____ 1075
Hardness, Shore _____ 46

*Example 5*

Two masterbatches of the composition of Example 1 were compounded, one (A) with 3 parts of ammonium benzoate and the other (B) with 3 parts of ammonium benzoate and one part of magnesium oxide. The elastomer mixes were cured at 165° C. for 10 minutes. The vulcanizates had the following properties:

|  | A | B |
| --- | --- | --- |
| Scorch time, 120° C., minutes | 13.0 | 8.8 |
| Elongation, percent | 500 | 390 |
| Tensile strength, p.s.i. | 1,325 | 1,325 |
| Modulus, 300% elongation, p.s.i. | 975 | 1,200 |
| Hardness, Shore | 46 | 55 |

*Example 6*

A masterbatch containing 100 parts of 95/5 ethyl acrylate/vinyl chloroethyl ether elastomer, 50 parts of SRF carbon black and 2 parts of stearic acid was prepared. The masterbatch was milled on a rubber mill with six parts of ammonium benzoate. The elastomer mix was cured in a mold at a temperature of 165° C. for 30 minutes. The vulcanizate had the following properties:

Scorch time, 120° C., minutes _____ 9.5
Tensile strength, p.s.i. _____ 1025
Elongation, percent _____ 830
Modulus, 300% elongation, p.s.i. _____ 350
Hardness, Shore _____ 39

*Example 7*

A masterbatch of the composition of Example 6 was compounded with 3 parts of ammonium benzoate and one part of magnesium oxide. The elastomer mix was cured at 165° C. for 60 minutes. The vulcanizate had the following properties:

Scorch time, 120° C., minutes _____ 6.2
Tensile strength, p.s.i. _____ 1775
Elongation, percent _____ 440
Modulus, 300% elongation, p.s.i. _____ 1275
Hardness, Shore _____ 64

*Example 8*

A masterbatch is prepared containing 100 parts of a chlorosulfonated polyethylene elastomer which contains 1.3% sulfur and 29.0% chlorine, 50 parts of SRF carbon black and 2 parts of stearic acid. The masterbatch is milled on a rubber mill with 3.0 parts of ammonium benzoate and 0.25 part of magnesium oxide. The elastomer mix is cured at a temperature of 165° C. for 10 minutes. Illustrative vulcanizate properties are shown below.

Tensile strengh, p.s.i. _____ 1850
Elongation, percent _____ 430
Modulus, 200 percent elongation, p.s.i. _____ 950
Hardness, Shore A _____ 66

*Example 9*

Two masterbatches are prepared each containing 100 parts of neoprene W, a nonsulfur-modified general purpose type of polychloroprene elastomer, 50 parts of SRF carbon black and two parts of stearic acid. The masterbatches are milled on a rubber mill with 3 parts of ammonium benzoate. The elastomer mixes are cured at a temperature of 165° C. for 5 minutes in one case and 6 minutes in the other.

|  | A | B |
|---|---|---|
| Cure time, minutes | 5 | 6 |
| Tensile strength, p.s.i | 1,000 | 2,450 |
| Elongation, percent | 370 | 310 |
| Modulus, 300%, p.s.i | 750 | 2,325 |
| Hardness, Shore A | 61 | 64 |

*Example 10*

One hundred parts of chlorobutyl rubber (HT–1066) is compounded with 5 parts of ammonium benzoate. Samples are cured at 165° C. for varying lengths of time and the Mooney viscosity of the cured samples is measured. Illustrative results are shown below.

| Vulcanization time (mins.): | Mooney viscosity |
|---|---|
| 4 | 16 |
| 6 | 19 |
| 9 | 31 |
| 10 | 50 |

*Example 11*

This example is intended to show the great improvement in scorch properties of a vulcanizate prepared with ammonium benzoate as compared with one prepared with ammonium carbonate as the curing agent.

Two masterbatches were prepared according to procedure of Example 1, from the following recipies:

|  | A | B |
|---|---|---|
| 97.5/2.5 ethyacrylate/vinyl chloroacetate | 100 | 100 |
| Stearic acid | 1 | 1 |
| Carbon Black (FEF) | 60 | 60 |
| Phenyl-beta-naphthylamine | 2 | 2 |
| Ammonium carbonate | 1.4 | |
| Ammonium benzoate | | 4 |

Each was cured at 165° C. for 8 minutes. The vulcanizates had the following physical and rheological properties.

|  | A | B |
|---|---|---|
| Tensile strength (p.s.i.) | 1,500 | 1,450 |
| Elongation | 320 | 440 |
| Modulus, 100% | 1,485 | 1,230 |
| Hardness, Shore A | 61 | 57 |

| Scorch Data | Minutes | |
|---|---|---|
| T Δ5—200° F | 19 | 40 |
| T Δ5—250° F | 4.5 | 8.1 |
| T Δ5—300° F | 2.05 | 2.9 |

I claim:
1. In the process of compounding and curing a synthetic, rubber-like, vulcanizable, active-halogen containing elastomeric polymer; the improvement which comprises: during said compounding, distributing through said polymer a curing agent consisting essentially of from about one to about twenty parts per 100 parts of copolymer of at least one ammonium salt of an organic carboxylic acid having a pKa value of at least three.
2. A process according to claim 1 in which said elastomeric polymer is a copolymer of ethyl acrylate and vinyl chloroacetate.
3. A process according to claim 1 in which said elastomeric polymer is a copolymer of ethyl acrylate and vinyl chloroethyl ether.
4. A process according to claim 1 in which said elastomeric polymer is a chlorosulfonated polyethylene.
5. A process according to claim 1 in which said elastomeric polymer is polychloroprene.
6. A process according to claim 1 in which the curing temperature is above 150° C.
7. A process according to claim 1 in which said acid is benzoic acid.
8. A process according to claim 1 in which said acid is adipic acid.
9. A process according to claim 1 in which said acid is terephthalic acid.
10. The vulcanizable product produced by the process of claim 1.

References Cited

UNITED STATES PATENTS 2,962,475  11/1960  Malz et al. _____ 260—92.3
3,201,373  8/1965  Kaizerman _____ 260—86.1

FOREIGN PATENTS 533,017  11/1956  Canada.

JOSEPH L. SCHOFER, *Primary Examiner.*

D. K. DENENBERG, *Assistant Examiner.*